(12) United States Patent
Wang et al.

(10) Patent No.: US 9,351,610 B2
(45) Date of Patent: May 31, 2016

(54) FOOD PROCESSOR WITH SHREDDING AND/OR SLICING FUNCTIONS

(71) Applicant: ELEC-TECH INTERNATIONAL CO., LTD., Zhuhai, Guangdong (CN)

(72) Inventors: Tony Wang, Zhuhai (CN); Xuejun Chen, Zhuhai (CN); Jianwei Chen, Zhuhai (CN)

(73) Assignee: ELEC-TECH INTERNATIONAL CO., LTD., Zhuhai (CN)

( * ) Notice: Subject to any disclaimer, the term of this patent is extended or adjusted under 35 U.S.C. 154(b) by 26 days.

(21) Appl. No.: 14/460,045

(22) Filed: Aug. 14, 2014

(65) Prior Publication Data

US 2015/0144723 A1    May 28, 2015

(30) Foreign Application Priority Data

Nov. 28, 2013    (CN) .................. 2013 2 0775274 U

(51) Int. Cl.
*A47J 43/00* (2006.01)
*A47J 43/07* (2006.01)
*B26D 7/26* (2006.01)
*A47J 43/044* (2006.01)
*A47J 43/04* (2006.01)
*B26D 1/29* (2006.01)
*B26D 3/28* (2006.01)

(52) U.S. Cl.
CPC .............. *A47J 43/0722* (2013.01); *A47J 43/04* (2013.01); *A47J 43/044* (2013.01); *B26D 1/29* (2013.01); *B26D 3/283* (2013.01); *B26D 7/2635* (2013.01); *A47J 43/00* (2013.01); *B26D 2003/287* (2013.01)

(58) Field of Classification Search
CPC ... A47J 43/0722; A47J 43/0716; A47J 43/00; A47J 43/04; A47J 43/044; B26D 1/29; B26D 7/2635

USPC ..................................................... 241/92, 286
See application file for complete search history.

(56) References Cited

U.S. PATENT DOCUMENTS

| 4,283,979 | A | * | 8/1981 | Rakocy | B26D 3/225 241/92 |
| 4,560,111 | A | * | 12/1985 | Cavalli | B26D 3/22 241/282.2 |
| 4,877,191 | A | * | 10/1989 | Golob | A47J 43/046 241/286 |
| 8,439,285 | B2 | * | 5/2013 | Beber | A47J 43/0722 241/286 |
| 8,833,683 | B2 | * | 9/2014 | Beber | A47J 43/255 241/286 |
| 9,049,965 | B2 | * | 6/2015 | Beber | A47J 43/0716 241/286 |
| 2007/0095959 | A1 | * | 5/2007 | Narai | A47J 43/255 241/92 |
| 2011/0139017 | A1 | * | 6/2011 | Beber | A47J 43/085 99/537 |
| 2013/0134245 | A1 | * | 5/2013 | Gushwa | A47J 43/0716 241/36 |

* cited by examiner

*Primary Examiner* — Faye Francis
(74) *Attorney, Agent, or Firm* — Kagan Binder, PLLC

(57) ABSTRACT

Provided is a food processor with shredding and/or slicing functions, including a driving device and a main component; the main component includes a main body, a lid, a transmission axle and a cutterhead component; the cutterhead component includes a fixed cutterhead and a movable cutterhead, a cutter body is disposed on the fixed cutterhead or the movable cutterhead, a cutting channel is formed between a cutting edge of the cutter body and the movable cutterhead or the fixed cutterhead for cut-out food passing through; the main component further includes a height adjusting mechanism configured to adjust a height of the cutting channel, and an operation part of the height adjusting mechanism is disposed on the lid. With the food processor of the present disclosure, the thickness of cut-out food can be adjusted without removing the lid, which is convenient for operating.

8 Claims, 12 Drawing Sheets

FOOD PROCESSOR WITH SHREDDING AND/OR SLICING FUNCTIONS

CROSS-REFERENCE TO RELATED APPLICATIONS

This application claims priority to Chinese Application No. 201320775274.9, "Food Processor with shredding and/or slicing functions", filed on Nov. 28, 2013, which is hereby incorporated by reference in its entirety.

TECHNICAL FIELD

The present disclosure relates to kitchen utensils, and more particularly to a food processor with shredding and/or slicing functions.

BACKGROUND ART

A food processor with shredding and/or slicing functions usually includes: a driving engine, a main body, a lid, a cutterhead component and a transmission axle; wherein, the main body is disposed above the driving engine, the lid is disposed above the main body, and a feeding channel is provided on the lid; the transmission axle is disposed along the rotation axis of the main body. The cutterhead component is disposed on the upper end of the transmission axle, and the cutterhead component has a cutter body extending in the radial direction. When cutting food, the driving engine drives the cutterhead component to rotate through the transmission axle, the food enters the cutterhead component in the main body through the feeding channel of the lid, and the cutter body of the cutterhead component cuts the foods into slices or shreds.

The cutterhead component in the prior art has following defects: users have different requirements for foods like different shapes and thickness and so on. However, due to the fixed level of the cutter body edge and the fixed level of the cutterhead component, only one thickness of the cut-out food can be obtained, which can not satisfy demands of users; otherwise, the user has to prepare multiple cutterhead components, of which the cost is too high. Of course there are very few products having structures for adjusting cutting thickness, however, before adjusting cutting thickness, the user has to open the lid of the products herein and take off the cutterhead of the products, which is inconvenient in use.

SUMMARY OF THE INVENTION

In view of the defects existing in the prior art, an object of the present disclosure is to provide a food processor with shredding and/or slicing functions, which allows a user to adjust the cutting thickness without opening the lid.

A food processor with shredding and/or slicing functions, comprising a driving device and a main component; the main component includes a main body, a lid, a transmission axle, a cutterhead component and a height adjusting mechanism; wherein, the lid is disposed on an opening at a top of the main body, and a feeding channel is provided on the lid, the transmission axle is disposed inside the main body, the cutterhead component is disposed on the transmission axle, the transmission axle is driven by the transmission axle to rotate around a rotation axis, and a cutter body is provided on the cutterhead component; and wherein, the cutterhead component comprises a fixed cutterhead and a movable cutterhead, the movable cutterhead can move relative to the fixed cutterhead in direction of the rotation axis; the cutter body is disposed on the fixed cutterhead, and a cutting channel is formed between a cutting edge of the cutting body and the movable cutterhead; or, the cutter body is disposed on the movable cutterhead, and a cutting channel is formed between a cutting edge of the cutting body and the fixed cutterhead; the height adjusting mechanism is configured to adjust a height of the cutting channel, and an operation part of the height adjusting mechanism is provided on the lid.

In some embodiments, the height adjusting mechanism comprises a limiting part, an elastic part, a lead screw transmission mechanism and the operation part; the limiting part is disposed on the lid at where the rotation axis locates, the limiting part is configured to position the movable cutterhead; the elastic part is configured to apply elastic force between the movable cutterhead and the limiting part; the operation part is rotatably disposed on the lid, and the operation part is connected to the limiting part through the lead screw transmission mechanism, so as to drive the limiting part to move in direction of the rotation axis.

In some embodiments, a structure channel extending in direction of the rotation axis is provided on the lid, both of the limiting part and the lead screw transmission mechanism are disposed inside the structure channel, and the operation part is located outside of the structure channel.

In some embodiments, the lead screw transmission mechanism comprises a screw with external thread at a lower end of the screw, and a threaded hole provided on an upper end of the limiting part, the lower end of the screw is screwed inside the threaded hole on the upper end of the limiting part, an upper end of the screw is extended out of the structure channel and connected to the operation part.

In some embodiments, a first guide track is provided on an outer surface of the limiting part, and a second guide slot engaging with the first guide track is provided on an inner surface of the structure channel; or, a first guide slot is provided on an outer surface of the limiting part, and a second guide track engaging with the first guide slot is provided on an inner surface of the structure channel.

In some embodiments, a bulge is provided on the upper end of the screw, the operation part comprises an annular body and a handle disposed on an outer surface of the annular body, a groove configured to match with the bulge is provided on an inner surface of the annular body, and the bulge is located in the groove.

In some embodiments, a connecting component is provided at the location of the rotation axis of the movable cutterhead, a limiting axle is provided on an upper end of the connecting component, the limiting part has a limiting hole on its lower end face for matching with the limiting axle, the limiting axle is inserted into the limiting hole, and a mating connector, configured to match with the connecting component, is provided at the location of the rotation axis of the fixed cutterhead.

In some embodiments, the upper part of the connecting component is stepped, and the mating connector has a stepped through-hole on its centre for matching with the connecting component, the connecting component is disposed through the mating connector, and a lower end of the mating connector is fixedly connected to an upper end of the transmission axle.

In some embodiments, the elastic part is a spring, the connecting component has a spring mounting hole on its lower end, the transmission axle has a concave hole on its upper end face, and a spring installation column is provided on a bottom face of the concave hole; both of the lower end of the connecting component and the lower end of the mating connector are accommodated in the concave hole, the spring installation column is inserted into the spring mounting hole, the spring is disposed on the spring installation column, a lower end of the spring is propped against the bottom face of the concave hole, and an upper end of the spring is propped against a bottom face of the spring mounting hole.

In some embodiments, a surrounding convex edge extending upwards and downwards in direction of the rotation axis is provided on an outer edge of the fixed cutterhead, and the surrounding convex edge surrounds the movable cutterhead.

As compared to the prior art, with regard to the food processor with shredding and/or slicing functions provided in the present disclosure, by means of adopting the technical scheme mentioned above, the cutterhead component is divided into the movable cutterhead and the fixed cutterhead, the movable cutterhead can move up and down within a certain distance while the fixed cutterhead is motionless in the up and down direction, thus the height from the cutting edge of the cutter body to the fixed cutterhead (namely the height of the cutting channel) can be changed, thereby changing the thickness of the cut-out food and satisfying different requirements of the users. Moreover, since the operation part of the height adjusting mechanism is disposed on the lid, the user can adjust the height of the cutting channel without taking out the cutterhead component, which is easier to operate for achieving different thicknesses of cut-out foods.

BRIEF DESCRIPTION OF THE DRAWINGS

FIG. 1 and FIG. 2 are assembly diagrams illustrating the main component of the food processor shredding/slicing functions according to one embodiment of present invention, wherein, FIG. 1 is a broken-out section view, ad FIG. 2 is a full section view;

FIG. 3 and FIG. 4 are assembly diagrams illustrating the cutterhead component and the transmission axle of the food processor as shown in FIG. 1, wherein, FIG. 3 illustrates a first height of the cutting edge of the cutter body before adjustment, and FIG. 4 illustrates a second height of the cutting edge of the cutter body after adjustment;

Wherein, the elements are denoted as follows:
100—Main body;
200—Lid;
210—Feeding channel;
220—Height adjusting mechanism;
221—structure channel;
221A—Guide track;
222—Screw;
222A—External thread;
222B—Bulge;
223—Limiting part;
223A—Internal thread;
223B—Guide slot;
223C—Limiting hole;
224—Operation part;
300—Pushing bar;
400—Cutterhead component;
410—Cutter body;
411—Cutting edge;
412—Cutting channel;
420—Fixed cutterhead;
421—Mating connector;
421A—Stepped through-hole;
423—Surrounding convex edge;
430—Movable cutterhead;
431—Connecting component;
432—Limiting axle;
440—Elastic Part;
500—Transmission axle;
510—Concave hole;
520—Mating hole;
530—Screw mounting hole;
540—Upper end face of the transmission axle.

PREFERRED EMBODIMENTS OF THE INVENTION

In order to make the purpose, technical solutions and advantages of the present disclosure to be understood more clearly, the present disclosure will be described in further details with the accompanying drawings and the following embodiments. It should be understood that the specific embodiments described herein are merely examples to illustrate the disclosure, not to limit the present disclosure.

Figure 1:
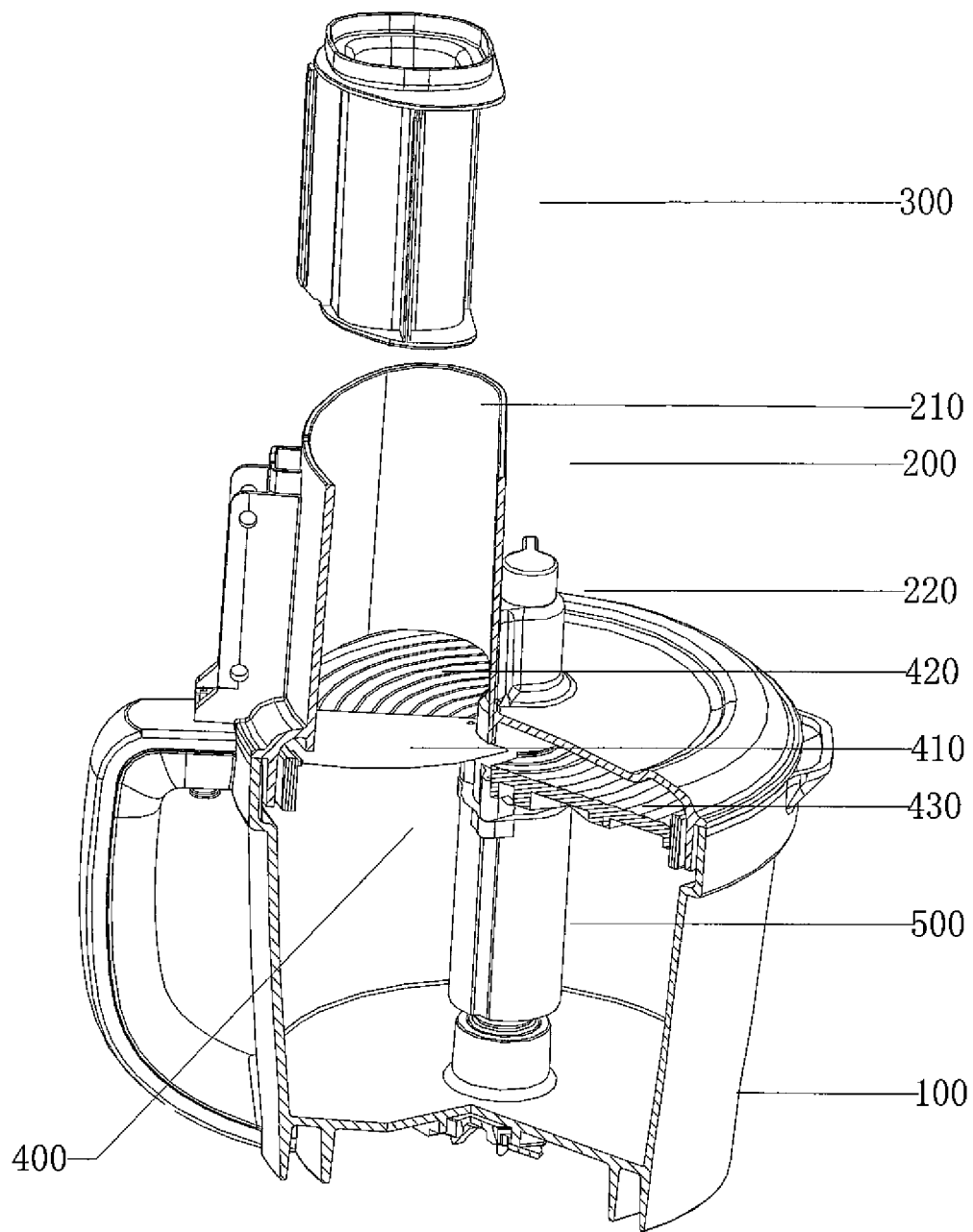
Figure 2:
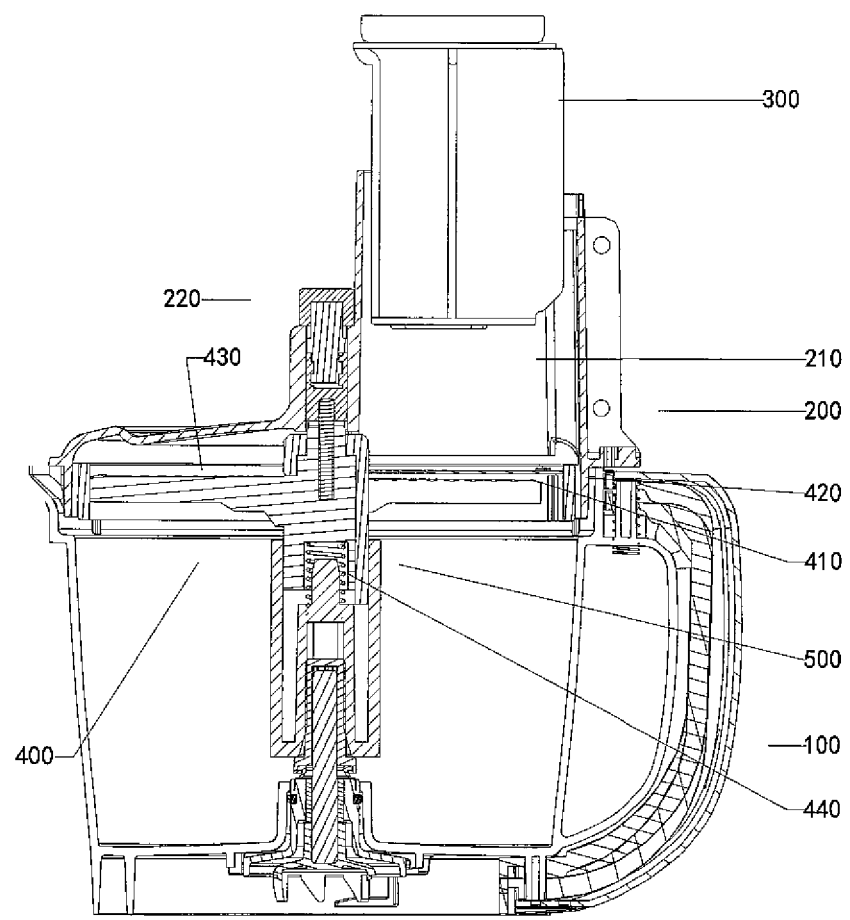
Figure 3:
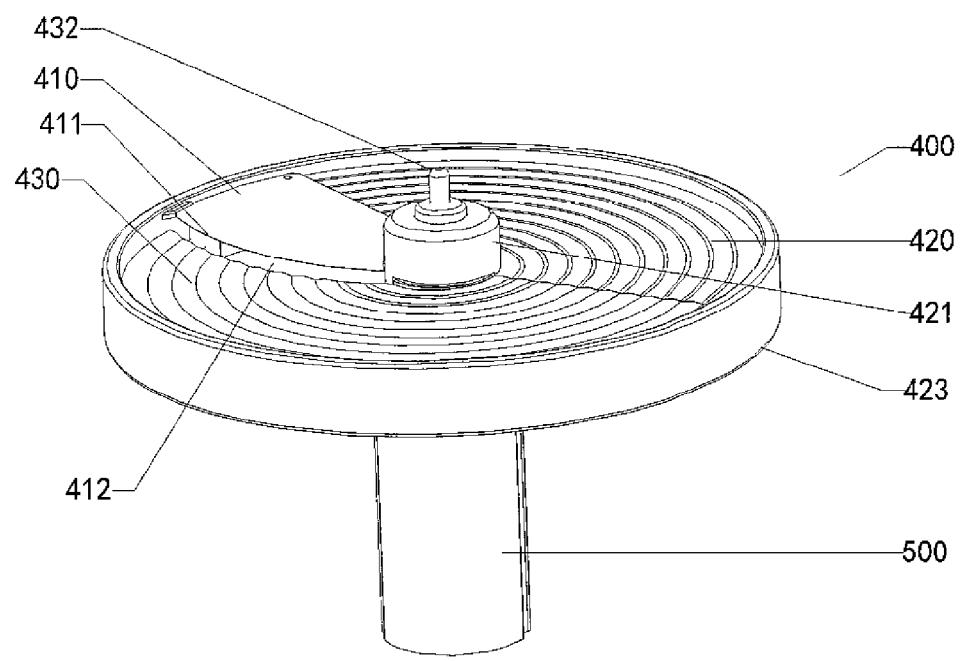
Figure 4:
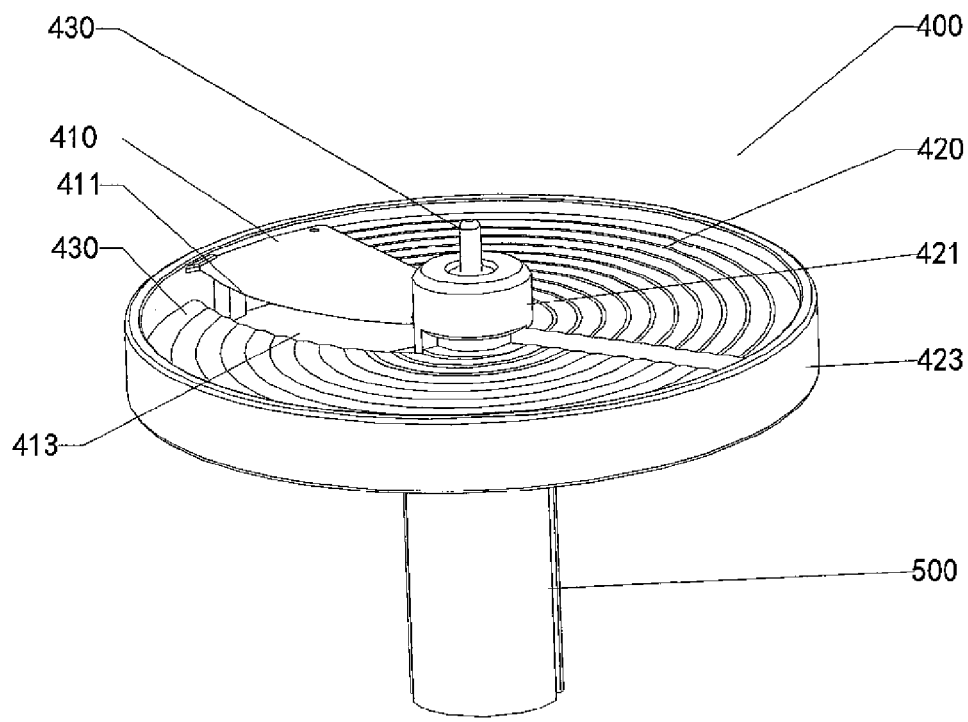
Figure 5:
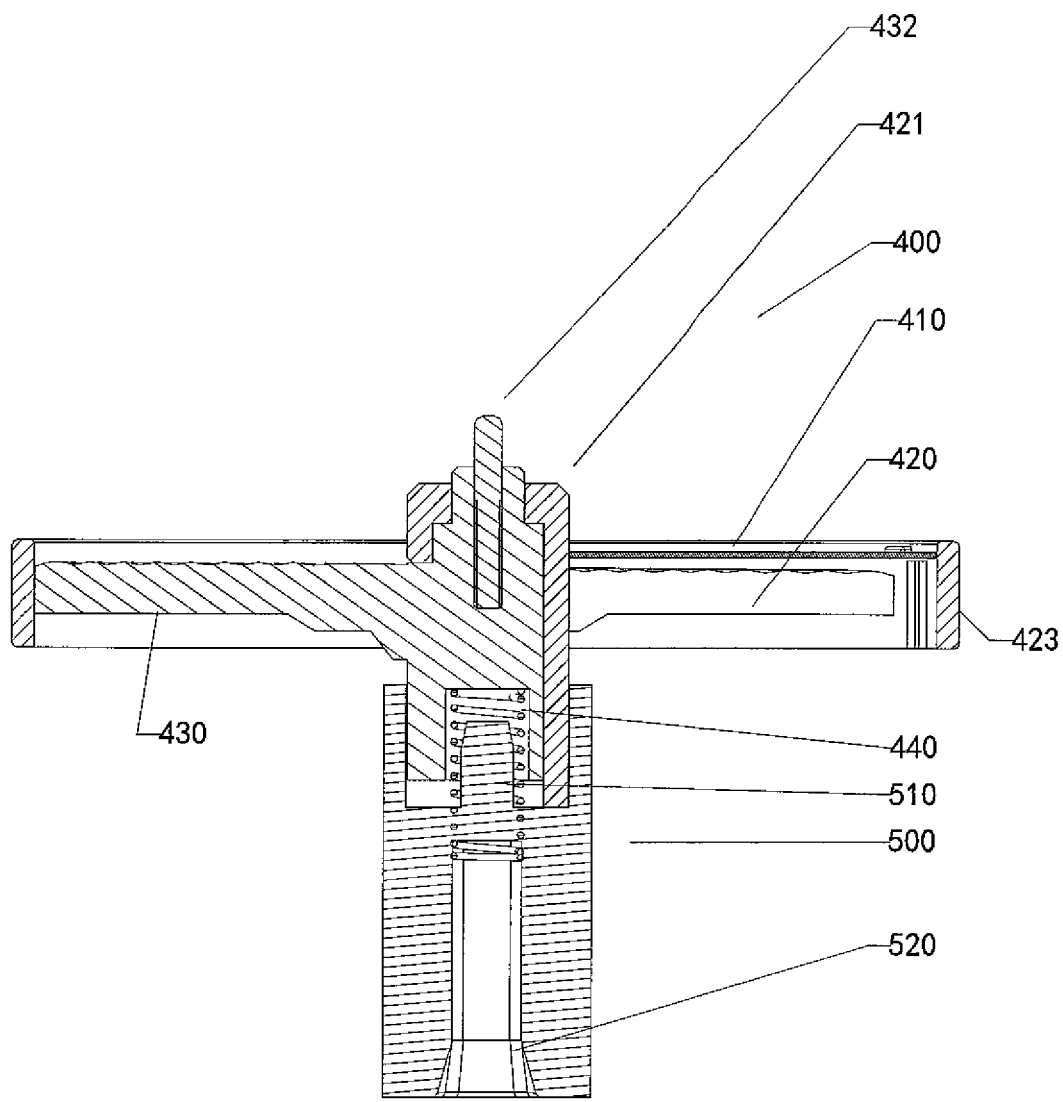
FIG. 5 is a section view of the assembly of the cutterhead component and the transmission axle of the food processor as shown in FIG. 3.
Figure 6:
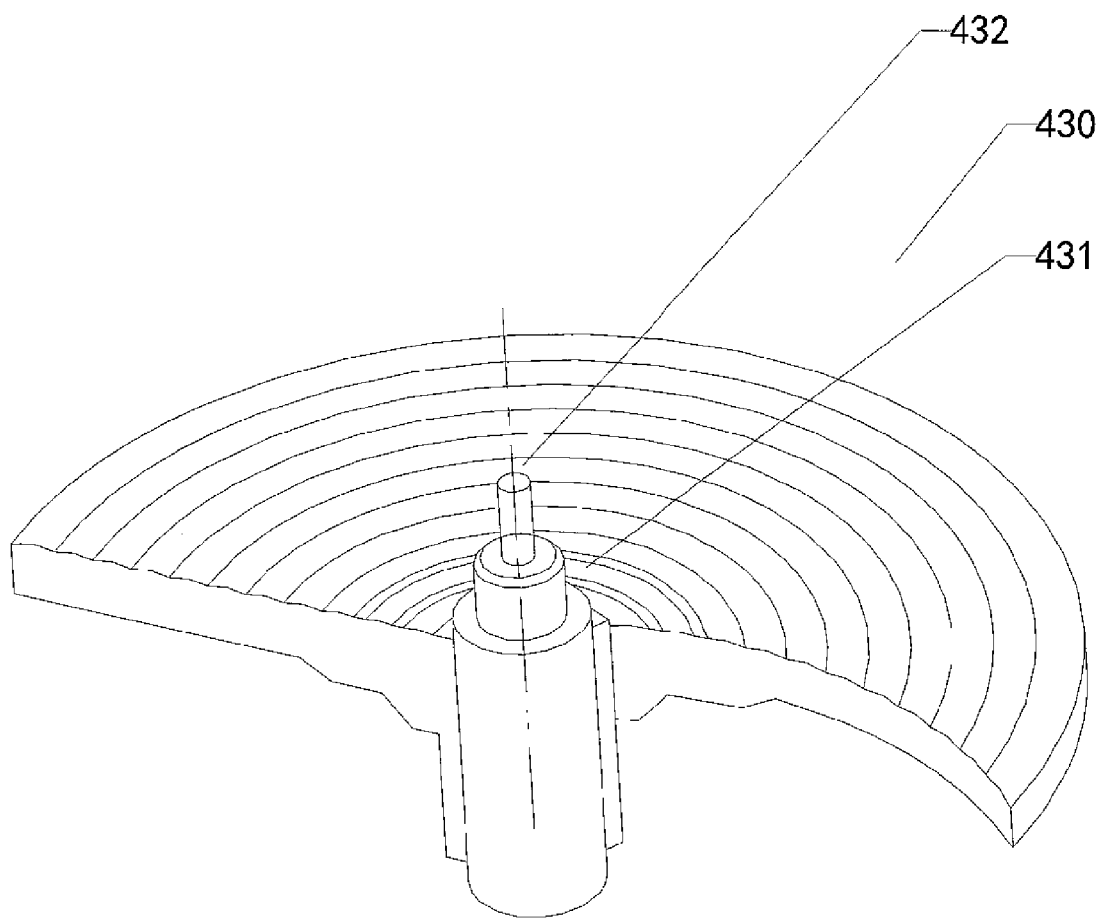
FIG. 6 is a schematic view illustrating the movable cutterhead of the food processor as shown in FIG. 1.
Figure 7:
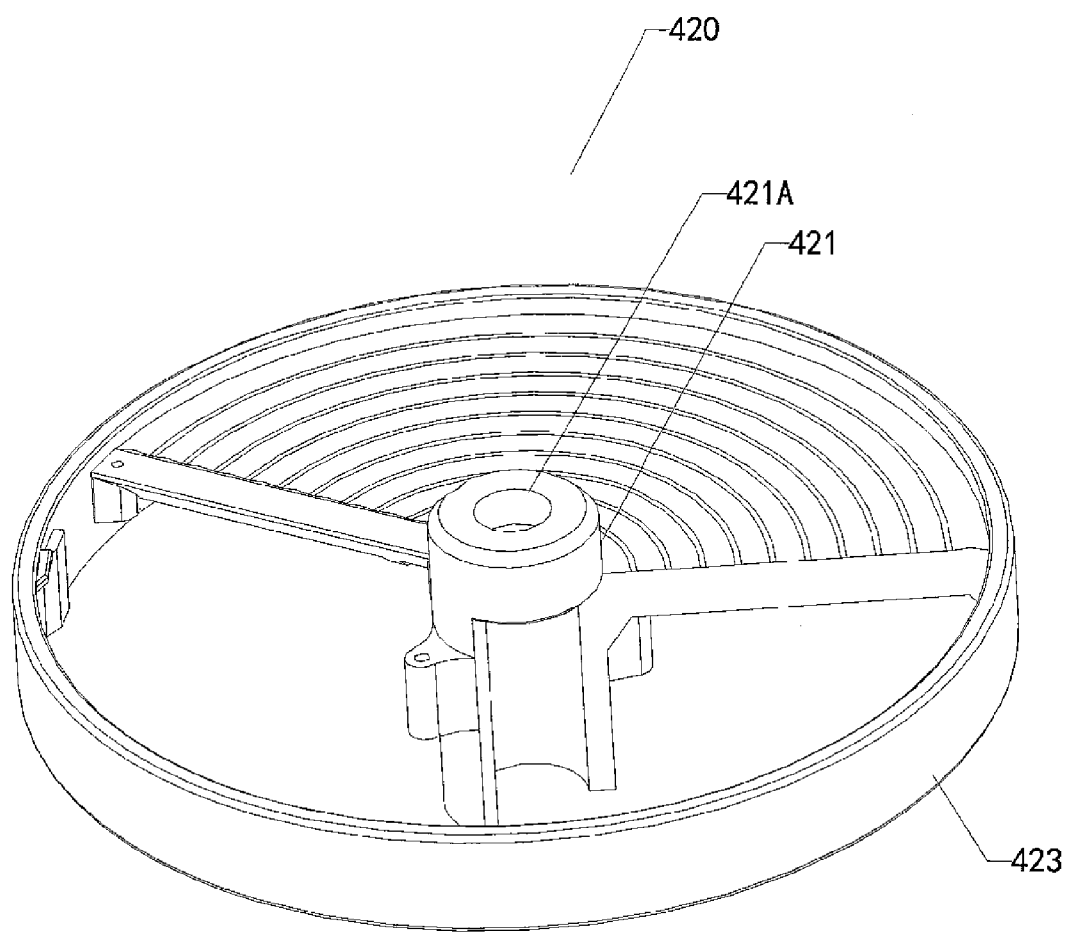
FIG. 7 is a schematic view illustrating the fixed cutterhead of the food processor as shown in FIG. 1.

In one embodiment as shown in FIG. 1 and FIG. 2, the food processor with shredding and/or slicing functions includes: a driving device (not shown in figures) and a main component; the main component includes a main body 100, a lid 200, a pushing bar 300, a transmission axle 500, a cutterhead component 400 and a height adjusting mechanism 220; the main body 100 is disposed on the driving device, and the main body 100 has an opening on its top, the lid 200 is disposed on the opening of the main body, and a feeding channel 210 is provided on the lid 200, and the pushing bar 300 can be inserted into the feeding channel 210. The transmission axle 500 is disposed along the rotation axis of the main body 100.

As shown in FIG. 3 to FIG. 7, the cutterhead component 400 is divided into a fixed cutterhead 420 and a movable cutterhead 430 along a radial cut-off line, and the movable cutterhead 430 can move relative to the fixed cutterhead 420 in direction along the rotation axis, a cutter body 410 is provided on the fixed cutterhead 420, and a cutting channel 412 is formed between a cutting edge 411 of the cutting body 410 and the movable cutterhead 430. Alternatively, the cutter body 410 can be disposed on the movable cutterhead 430. The prepared foods (such as fruits or vegetables) are put into the food processor through the feeding channel 210, and enter the cutterhead component 400 under the action of the pushing bar 300; and with rotation of the cutterhead component 400 driven by the transmission axle 500, the cutting edge 411 of the cutter body cuts the foods into shreds/slices, and then the shreds/slices enter the main body through the cutting channel 412. Since the movable cutterhead 430 can move up and down within a certain distance while the fixed cutterhead 420 is motionless in the up and down direction, the first height from the cutting edge 411 of the cutter body 410 to the fixed cutterhead 420 (namely the height of the cutting channel 412) can be changed, thereby changing the thickness of the cut-out foods and satisfying different requirements of the users.

In some embodiments, a connecting component 431 is provided at the location of the rotation axis of the movable cutterhead 430, a limiting axle 432 is provided on an upper end of the connecting component 431, and a mating connector 421 configured to match with the connecting component 431 is provided at the location of the rotation axis of the fixed cutterhead. Furthermore, the upper part of the connecting component 431 is stepped, and the mating connector 421 has a stepped through-hole 421A at its centre for matching with the connecting component 431, and the connecting component 431 can be movably disposed through the mating connector 421 in direction of the rotation axis, and the lower end of the mating connector 421 is fixedly connected with the upper end of the transmission axle 500.

In some embodiments, a surrounding convex edge 423 extending upwards and downwards in direction of the rotation axis is provided on the outer edge of the fixed cutterhead 420, and the surrounding convex edge 423 surrounds the movable cutterhead 430. The surrounding convex edge 423 of the fixed cutterhead 420 functions to strengthen the fixed cutterhead 420; meanwhile, because the movable cutterhead 430 is movable up and down, when cutting food, the movable cutterhead 430 will waggle and tilt, affecting the cutting effect, in this case, the surrounding convex edge 423 helps to reduce the amplitude of the waggle of the outer edge of the movable cutterhead 430, because the fit clearance between the inner wall of the surrounding convex edge 423 of the fixed cutterhead 420 and the outer edge of the movable cutterhead 430 is smaller.

Figure 8:
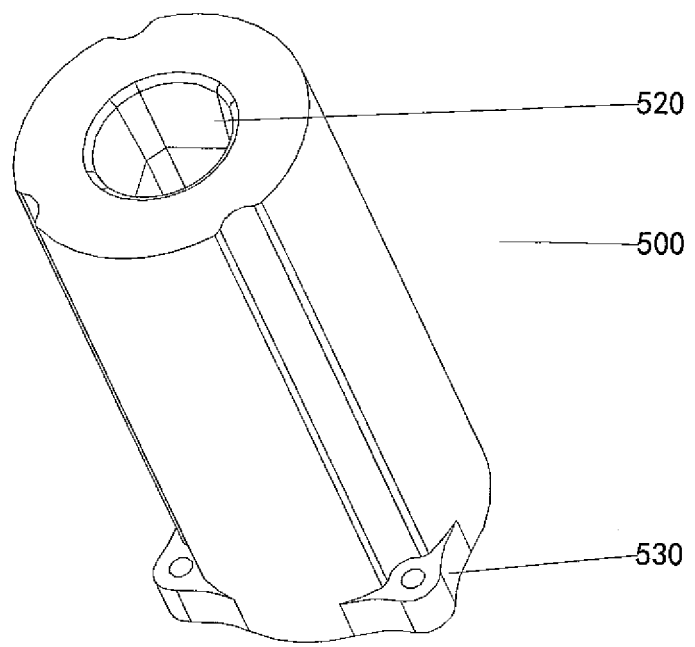
FIG. 8 and FIG. 9 are schematic views illustrating the transmission axle of the food processor as shown in FIG. 1.
Figure 9:
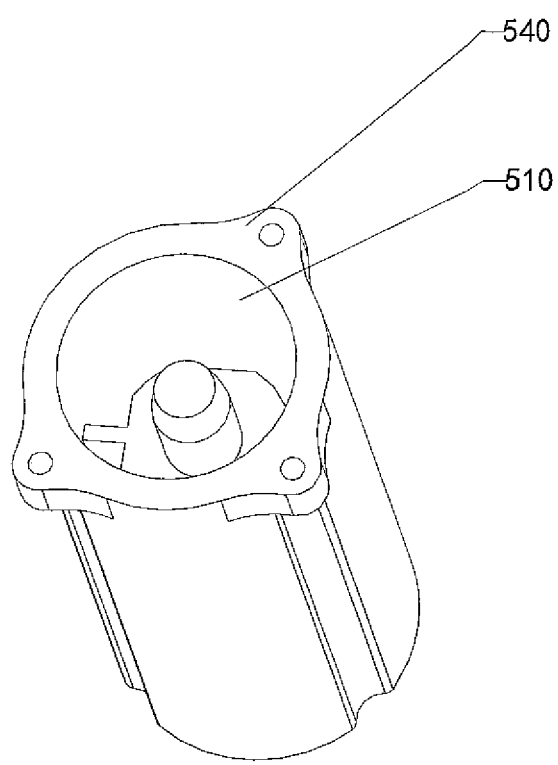

As shown in FIG. 8 and FIG. 9, the transmission axle 500 has a concave hole 510 on its upper end face 540, and has a mating hole 520 on its lower end. Both of the lower end of the connecting component 431 and the lower end of the mating connector 421 are accommodated in the concave hole 510. The transmission axle 500 has screw mounting holes 530 on its upper end face 540, and the transmission axle 500 and the fixed cutterhead 420 are fixedly connected by screws passing through the screw mounting holes 530 or by other means. The connecting component 431 of the movable cutterhead 430 can axially move up and down between the fixed cutterhead 420 and the transmission axle 500, thereby achieving the effect that the movable cutterhead 430 can axially move up and down within a limited distance.

Figure 10:
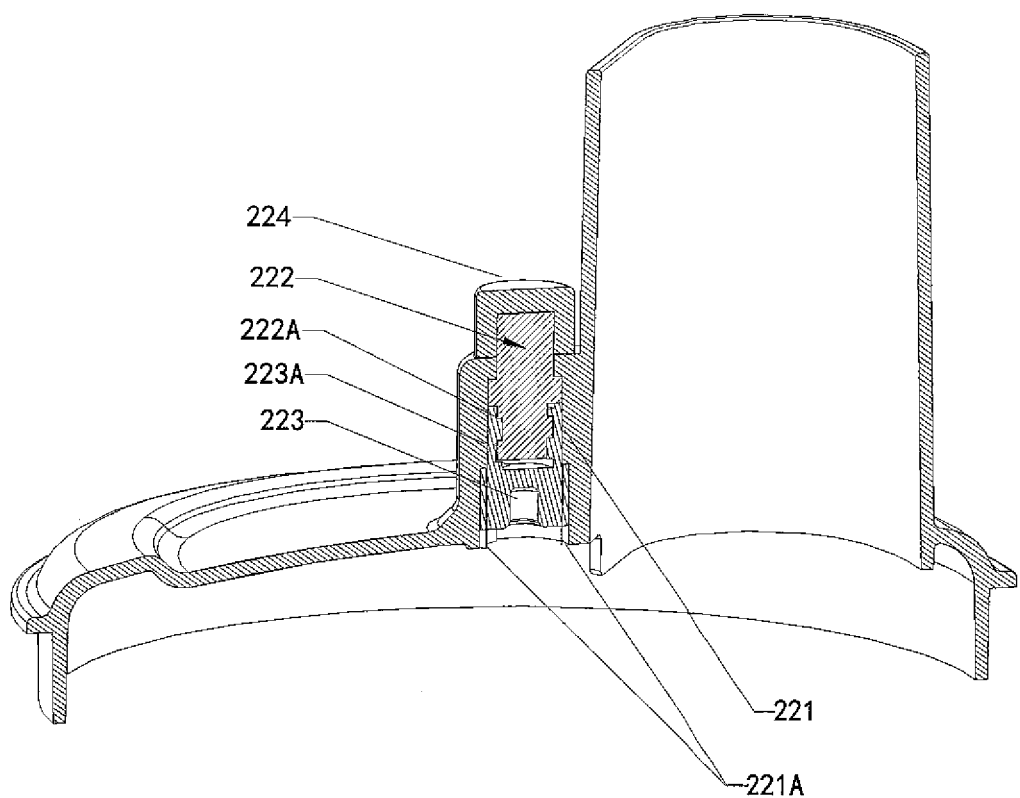
FIG. 10 is a section view illustrating the height adjusting mechanism of the food processor as shown in FIG. 1.
Figure 11:
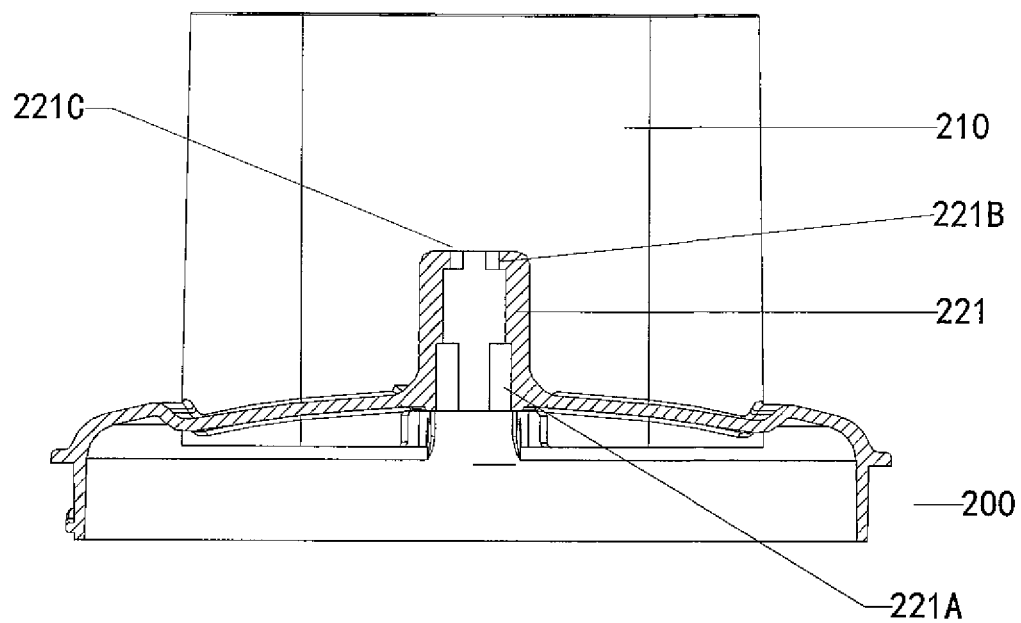
FIG. 11 is a section view illustrating the structure channel of the height adjusting mechanism as shown in FIG. 10.
Figure 12:
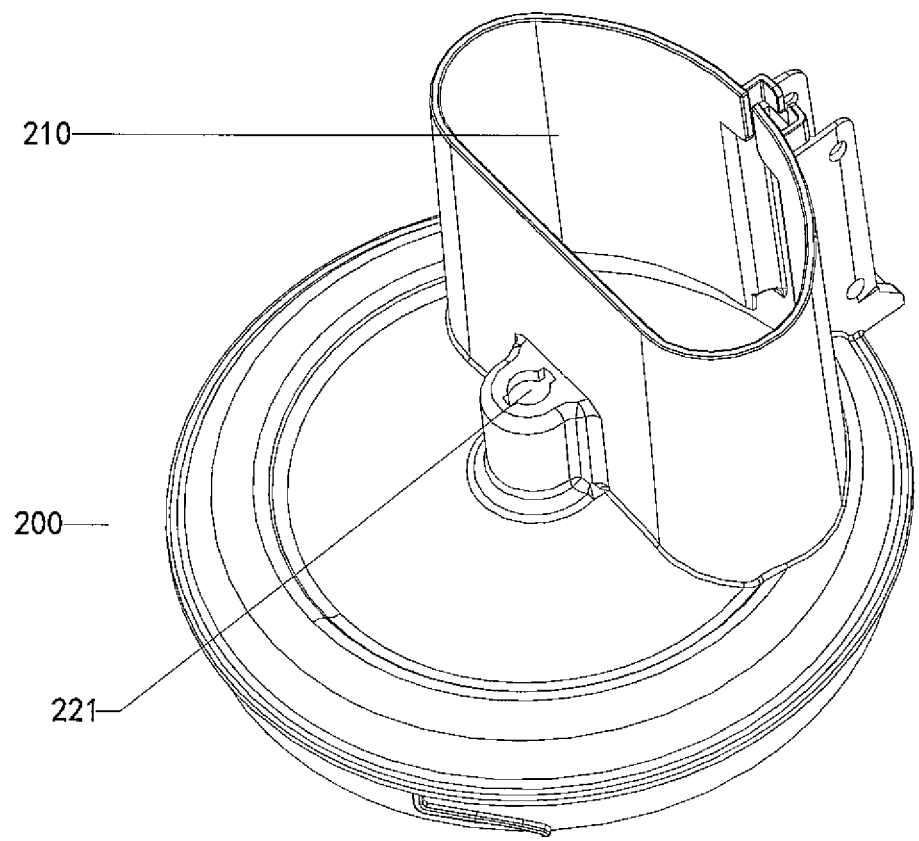
FIG. 12 is a schematic view illustrating the lid of the food processor as shown in FIG. 1.

As shown in FIG. 1 and FIG. 10, the height adjusting mechanism 220, configured to adjust the height of the cutting channel 412, includes a limiting part 223, an elastic part (not shown in these figures), a lead screw transmission mechanism and the operation part 224. As shown in FIG. 11 and FIG. 12, the lid 200 has a structure channel 221 extending in direction of the rotation axis, both of the limiting part 223 and the lead screw transmission mechanism are disposed inside the structure channel 221, and the operation part 224 is located outside the structure channel 221.

Figure 15:
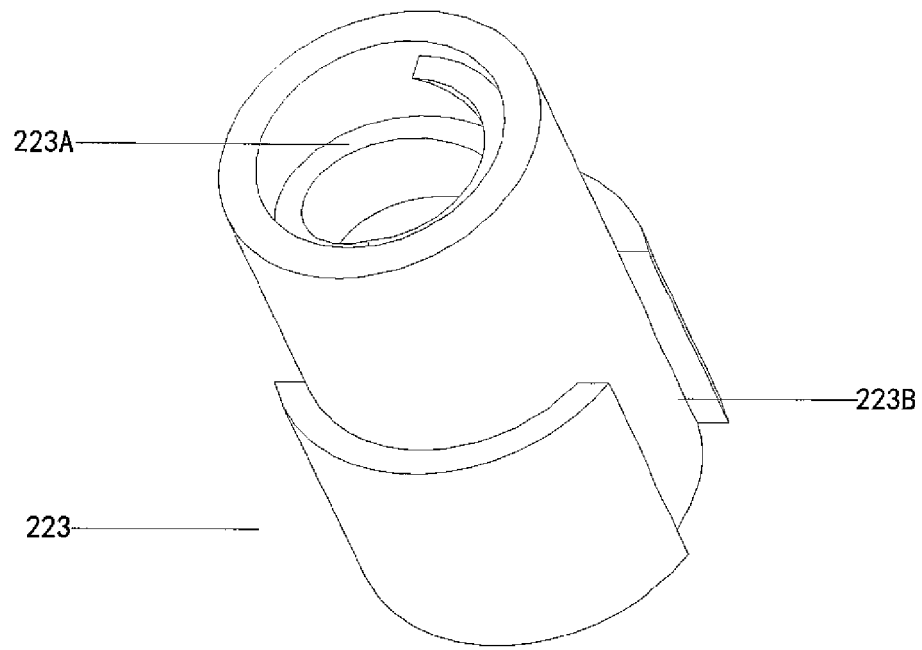
FIG. 15 and FIG. 16 are schematic views illustrating the limiting part of the food processor as shown in FIG. 1.
Figure 16:
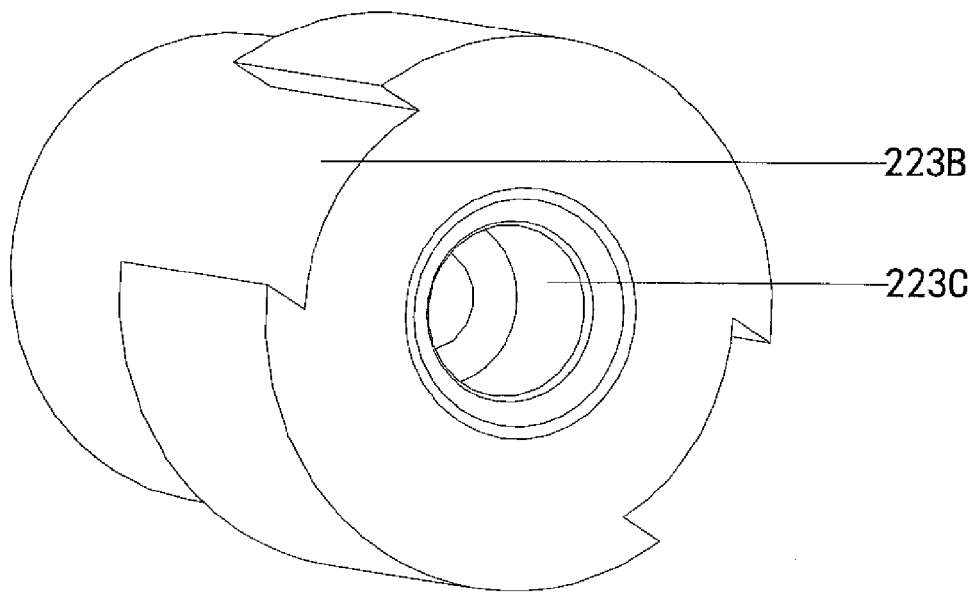

As shown in FIG. 15 and FIG. 16, the limiting part 223 is disposed above the movable cutterhead at the location of the rotation axis, and the limiting part 223 has a limiting hole 223C on its lower end face, and the limiting hole 223C engages with the limiting axle 432 to position the movable cutterhead 430.

The elastic part is configured to apply elastic force between the movable cutterhead 430 and the limiting part 223. In some embodiments, the elastic part 400 is a spring, and the connecting component 431 has a spring mounting hole on its lower end, a spring installation column is provided on the bottom face of the concave hole 510, and the spring installation column is inserted into the spring mounting hole, and the elastic part 400 is disposed on the spring installation column. The lower end of the spring is propped against the bottom face of the concave hole 510, and the upper end of the spring is propped against the bottom face of the spring mounting hole. Since the transmission axle 500 is fixedly connected to the fixed cutterhead 420, the movable cutterhead 430, under the elastic force, forces the limiting outward flange of the movable cutterhead to move into the limiting inward flange of the fixed cutterhead, so as to ensure the distance between the movable cutterhead 430 and the fixed cutterhead 420 always being the maximum value when the movable cutterhead 420 is not adjusted.

Figure 13:
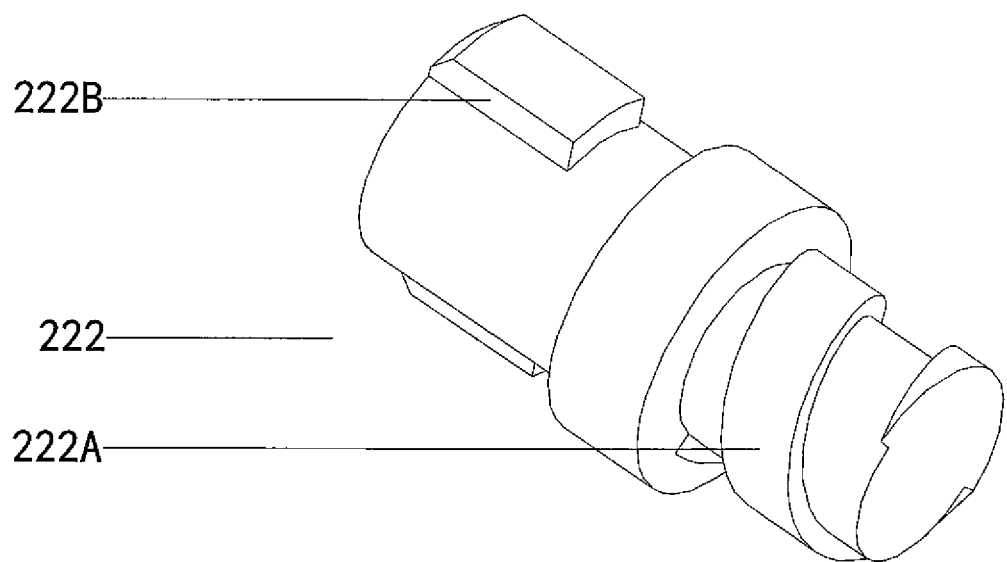
FIG. 13 is a schematic view illustrating the screw of the food processor as shown in FIG. 1.
Figure 14:
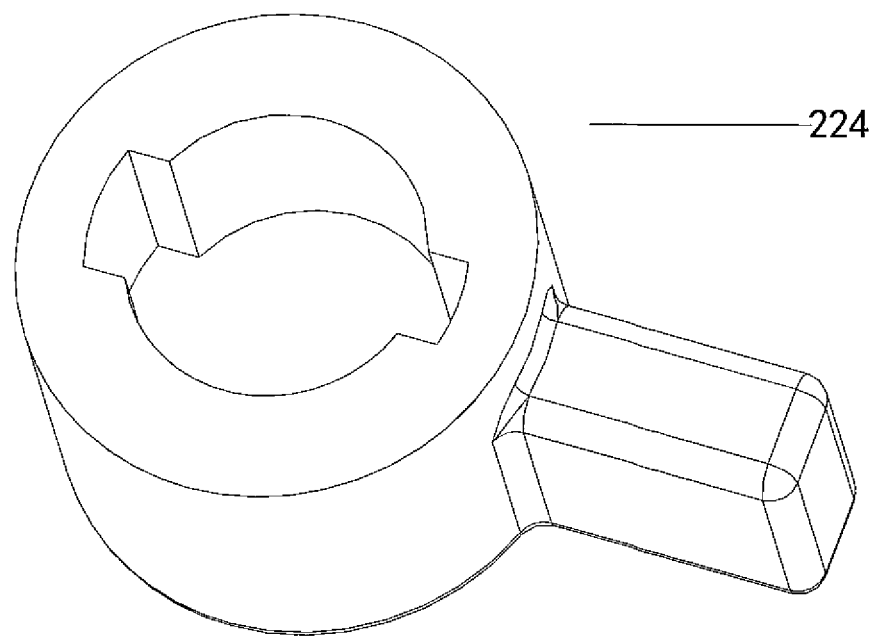
FIG. 14 is a schematic view illustrating the operation part of the food processor as shown in FIG. 1.

The lead screw transmission mechanism is configured to transmit the rotation of the operation part 224 into the rectilinear motion. As shown in FIG. 13, FIG. 15 and FIG. 16, the lead screw transmission mechanism includes a screw 222 with external threads 222A at a lower end thereof, and a screw hole with internal threads 223A on the upper end of the limiting part 223; the lower end of the screw 222 is screwed into the screw hole on the upper end of the limiting part 223, and the upper end of the screw 222 is extended out of the structure channel 221 and is connected to the operation part 224.

The operation part 224 is rotatably disposed on the lid for convenient in use. In some embodiments, a bulge 222B is provided on the upper end of the screw 222 extending out of the structure channel 221, the operation part 224 includes an annular body and a handle disposed on the outer surface of the annular body, and a groove configured to engage with the bulge 222B is provided on the inner surface of the annular body, and the bulge 222B is located inside the groove.

In some embodiments, as shown in FIG. 11 and FIG. 12, at least one guide track 221A is provided upwards from the inner bottom of the structure channel 221. The guide track 221A of the structure channel 221 engages with the limiting part, so that the limiting part 223 is kept motionless in the radial direction, and just can move up and down.

In some embodiments, as shown in FIG. 11, FIG. 15 and FIG. 16, a guide slot 223B is provided on the outer surface of the limiting part 223, the guide slot 223B engages with the guide track 221A of the structure channel 221, so as to ensure the guide slot 223 moving along the guide track 221A only.

In conclusion, the food processor of the preset disclosure works as follows:

When the user needs to control the thickness of the cut-out food, the user can adjust the operation part 224 on the height adjusting mechanism 220. The operation part 224 is fixedly connected to the screw 222, therefore, the screw 222 is driven to rotate, and since the limiting part 223 has the guide slot 223B matching with the guide track 221A of the structure channel 221, the limiting part 223 only can move up and down. Meanwhile, after the operation part 224 is connected to the screw 222, its move in up and down directions is limited by the upper end face of the structure channel 221 of the height adjusting mechanism 220, so that the operation part 224 and the screw 222 can not move up and down; as a result, when the screw 222 is rotated, under the effect of the thread, the limiting part 223 can be moved up and down. In the meantime, since the movable cutterhead 430 is subjected to the elastic force generated by the spring disposed inside the connecting component 431 of the movable cutterhead 430, the limiting axle 432 of the cutterhead 430 is limited inside the limiting hole 223C of the limiting part 223. Therefore, when the axle sleeve moves up and down, the movable cutterhead 430 will move up and down along with the motion of the axle sleeve, so as to generate different relative heights between the cutter body 410 of the fixed cutterhead 420 and the movable cutterhead 430, thereby achieving different thicknesses of cut-out foods.

It should be understood by those skilled in the art that what described above are preferred embodiments of the present invention. Various modifications and replacements may be made therein without departing from the theory of the present disclosure, and should also be seen in the scope of the present disclosure.

What is claimed is:

1. A food processor with shredding and/or slicing functions, comprising a driving device and a main component; said main component comprises a main body, a lid, a transmission axle, a cutterhead component, and a height adjusting mechanism;

wherein, said lid is disposed on an opening at a top of said main body, and a feeding channel is provided on said lid, said transmission axle is disposed inside said main body, said cutterhead component is disposed on said transmission axle, said cutterhead component is driven by said transmission axle to rotate around a rotation axis, and a cutter body is provided on said cutterhead component; and wherein, said cutterhead component comprises a fixed cutterhead and a movable cutterhead, said movable cutterhead can move relative to said fixed cutterhead in direction of said rotation axis; said cutter body is disposed on said fixed cutterhead, and a cutting channel is formed between a cutting edge of said cutting body and said movable cutterhead; or, said cutter body is disposed on said movable cutterhead, and a cutting channel is formed between a cutting edge of said cutting body and said fixed cutterhead; said height adjusting mechanism is configured to adjust a height of said cutting channel, said height adjusting mechanism comprises a limiting part, an elastic part, a lead screw transmission mechanism, and an operation part provided on said lid; said limiting part is disposed on said lid at where said rotation axis locates, said limiting part is configured to position said movable cutterhead; said elastic part is configured to apply elastic force between said movable cutterhead and said limiting part; said operation part is rotatably disposed on said lid, and said operation part is connected to said limiting part through said lead screw transmission mechanism, so as to drive said limiting part to move in direction of said rotation axis;

a connecting component is provided at the location of the rotation axis of said movable cutterhead, a limiting axle is provided on an upper end of said connecting component, said limiting part has a limiting hole on its lower end face for matching with said limiting axle, said limiting axle is inserted into said limiting hole, and a mating connector, configured to match with said connecting component, is provided at the location of the rotation axis of said fixed cutterhead.

2. The food processor with shredding/dicing functions according to claim 1, wherein, a structure channel extending in direction of said rotation axis is provided on said lid, both of said limiting part and said lead screw transmission mechanism are disposed inside said structure channel, and said operation part is located outside of said structure channel.

3. The food processor with shredding and/or slicing functions according to claim 2, wherein, said lead screw transmission mechanism comprises a screw with external thread at a lower end of the screw, and a threaded hole provided on an upper end of said limiting part, the lower end of said screw is screwed inside the threaded hole on the upper end of said limiting part, an upper end of said screw is extended out of said structure channel and connected to said operation part.

4. The food processor with shredding and/or slicing functions according to claim 3, wherein, a first guide track is provided on an outer surface of said limiting part, and a second guide slot engaging with said first guide track is provided on an inner surface of said structure channel; or, a first guide slot is provided on an outer surface of said limiting part, and a second guide track engaging with said first guide slot is provided on an inner surface of said structure channel.

5. The food processor with shredding and/or slicing functions according to claim 3, wherein, a bulge is provided on the upper end of said screw, said operation part comprises an annular body and a handle disposed on an outer surface of said annular body, a groove configured to match with said bulge is provided on an inner surface of said annular body, and said bulge is located in said groove.

6. The food processor with shredding and/or slicing functions according to claim 1, wherein, the upper part of said connecting component is stepped, and said mating connector has a stepped through-hole on its centre for matching with said connecting component, said connecting component is disposed through said mating connector, and a lower end of said mating connector is fixedly connected to an upper end of said transmission axle.

7. The food processor with shredding and/or slicing functions according to claim 6, wherein, said elastic part is a spring, said connecting component has a spring mounting hole on its lower end, said transmission axle has a concave hole on its upper end face, and a spring installation column is provided on a bottom face of said concave hole; both of the lower end of said connecting component and the lower end of said mating connector are accommodated in said concave hole, said spring installation column is inserted into said spring mounting hole, said spring is disposed on said spring installation column, a lower end of said spring is propped against the bottom face of said concave hole, and an upper end of said spring is propped against a bottom face of said spring mounting hole.

8. The food processor with shredding and/or slicing functions according to claim 1, wherein, a surrounding convex edge extending upwards and downwards in direction of said rotation axis is provided on an outer edge of said fixed cutterhead, and said surrounding convex edge surrounds said movable cutterhead.

* * * * *